Nov. 21, 1967  S. H. BAMBERGER ET AL  3,353,893
REAR VIEW AUTOMOTIVE PERISCOPE UTILIZING TORIS MIRRORS
Filed April 6, 1967  2 Sheets-Sheet 1

*INVENTORS*
STEVEN H. BAMBERGER
& MILO O. RUDD

BY McLean, Morton & Boustead
ATTORNEYS

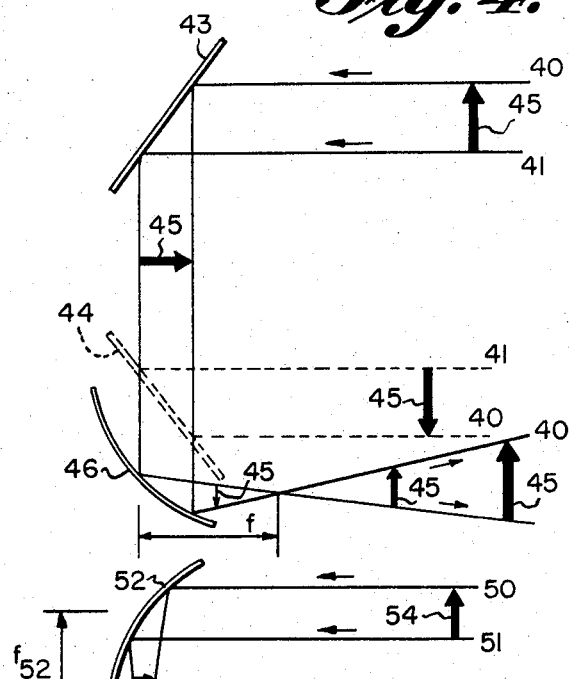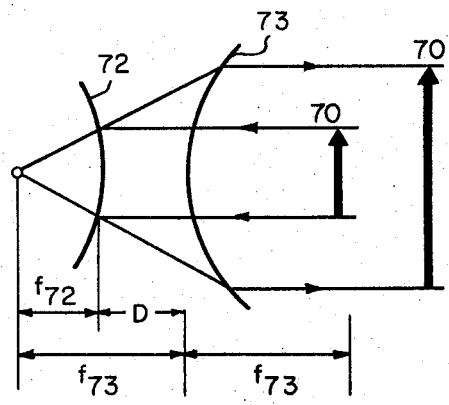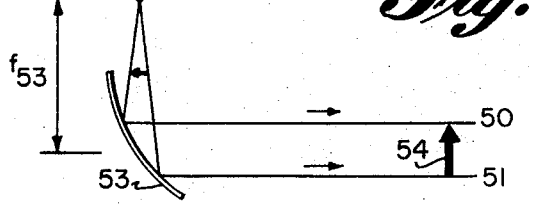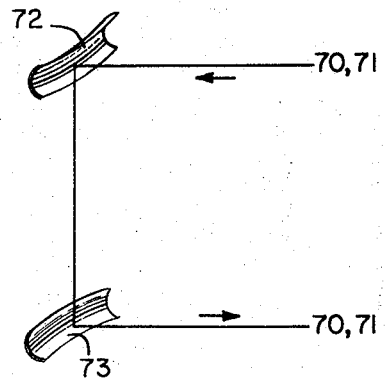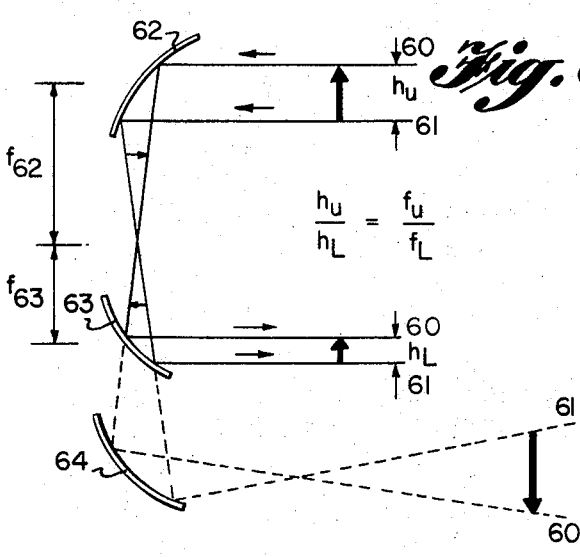

United States Patent Office 3,353,893
Patented Nov. 21, 1967

3,353,893
REAR VIEW AUTOMOTIVE PERISCOPE
UTILIZING TORIC MIRRORS
Steven H. Bamberger, Deal, N.J. 07723, and Milo O.
Rudd, 2119 NE. 15th Terrace, Fort Lauderdale, Fla.
33308
Filed Apr. 6, 1967, Ser. No. 628,885
2 Claims. (Cl. 350—55)

ABSTRACT OF THE DISCLOSURE

A rear-view periscope for automobiles consisting of an upper rearward facing mirror, with compound convex concave curvature and a spaced lower mirror with compound concave curvature.

Cross reference to related applications

This application is a continuation-in-part of our application "Improved Back View Automotive Periscope" filed Aug. 15, 1963, Ser. No. 302,320, pending before the U.S. Patent Office on the date of filing hereof and now abandoned.

Background of invention

There have been many proposals made for rear-view devices for automobiles, all of them intended to overcome drawbacks of conventional rear-view mirror installations. With the usual "front-and-center" interior placement of a rear-view mirror, the optimum in driver convenience is obtained, but the field of vision is more or less restricted by the structure of the vehicle itself and is totally, or in great part, blocked off by a normally placed capacity load either of persons or goods. With the alternative side-arm placement of a single rear-view mirror, the driver must inconveniently shift his attention from the road ahead, the field of vision is still more or less blocked by the vehicle structure, but further interference by normally placed loads is eliminated.

Prior art

That a suitable periscope would overcome the disadvantages of both placements and provide a freer field of view than either of these mirrors, early occurred to motor car users. All manner of underfloor, roof tunnel, side prism and multi-mirror combinations have been proposed, but none of these have gone into wide-spread use. The drawbacks of these combinations include excessive bulk, over-complication, prohibitive expense, and wrongly inverted or too small image.

Perhaps the most nearly satisfactory rear-view periscope which has heretofore been described is of the type disclosed in the Swedish patent to A. W. Ruberg, No. 78,482 of 1933. A further modification of this idea is disclosed in U.S. Patent No. 2,942,522 issued to J. E. Merriam in 1960. Another modification is disclosed in U.S. Patent No. 3,001,450 issued to W. L. Hyde in 1961.

Each of the periscopes, there disclosed, comprise two mirrors, one of which is plane in the vertical section and picks up the image of the view to the rear and reflects it upon a concave second mirror which in turn reflects a correctly erected image of the rearward view to the driver. Ruberg and Merriam rely on the lower concave mirror to re-erect the image and therefore their arrangements only operate when the driver is beyond the focal distance of the concave mirror. One serious difficulty, however, is encountered in a rear-view periscope comprising such an arrangement of mirrors. It is that these mirrors produce an image blurred by astigmatism. Such astigmatism in the image seen from a moving vehicle will in a very short time produce considerable eye strain for the driver, and is therefore unacceptable for automotive use. Hyde, in addition to the two mirrors mentioned, has a focusing lens in the roof. His system solves the aforementioned astigmatism problem but requires a redesigned roof, a large exposed mirror above the driver and allows only a limited amount of light through the multiple element system.

Broadly, a rear-view periscope in accordance with my invention comprises a pair of complementarily-curved toric mirrors, one positioned to pick up the view to the rear and reflect it to the second which is directly visible to the operator viewer. Where the term "mirror" is used, it is intended to include any suitably curved single reflecting surface. For example, either first or second surface mirrors are included.

Summary of invention

The object of the present invention is to provide an improved rear-view periscope which will reflect a properly erected, acceptably sized wide angle image of the scene to the rear of a viewer in a moving vehicle, which image is free from bothersome distortion and astigmatism and produces no noticeable eye strain despite long periods of use.

It is a further object of the invention to provide in the simplest possible form such a rear-view periscope which is convenient to use, has a rearward view unobstructed by structure or load, is capable of easy installation, and is inexpensive to produce in quantity.

A further object of the invention is that by using a convex-concave set of mirrors in horizontal section the size of the upper mirror may be reduced and the field subtended by it increased.

Brief description of drawings

For a better understanding of the preferred embodiments, reference is made to the accompanying drawings in which:

FIG. 4 is a view transverse to the path of the light rays of prior proposals.

FIG. 5 is a view similar to FIG. 4 of equally curved properly spaced mirrors according to this invention.

FIG. 6 is a view similar to FIG. 5 but using mirrors of unequal radii of curvature.

FIG. 7 is a schematic view of a convex and concave mirror set used to magnify and reflect incoming rays.

FIG. 8 is a perspective view of the mirrors shown in FIG. 7.

Description of preferred embodiments

The invention contemplates use of two torical mirrors. The upper mirror is a torical mirror which is concave in the vertical meridian and convex in the horizontal meridian. The lower mirror is a torical mirror with both meridians concavely curved and with a horizontal radius of curvature typically longer than the vertical radius of curvature.

EXAMPLE 1

Figure 1:
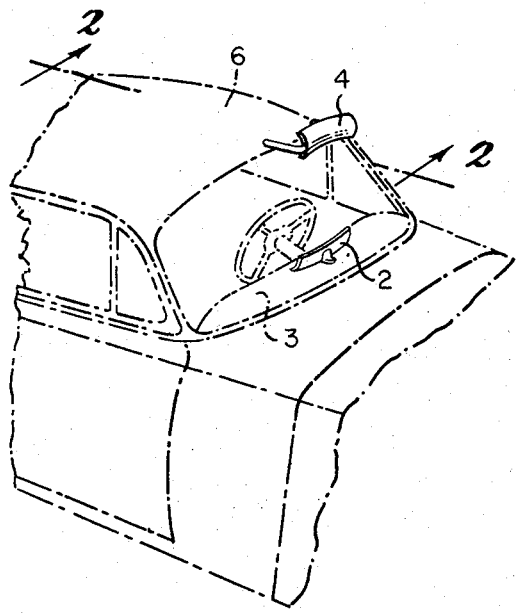
FIG. 1 is a perspective view of the forward position of the front seat of an automobile showing a lower mirror mounted on the dashboard in front of the steering wheel and showing the upper mirror mounted on the roof of the car.
Figure 2:
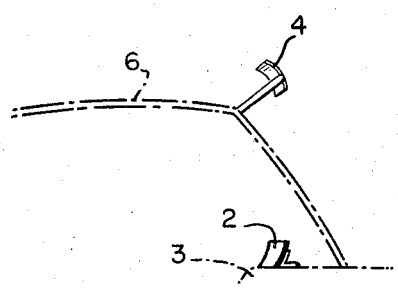
FIG. 2 is a sectional view taken on the line 2—2 of FIG. 1, showing the lower mirror on a suitable mounting and the upper mirror positioned above the lower mirror.

Our first preferred embodiment which is shown in FIGS. 1 and 2 is a rear-viewing system for a modern automobile 1. The lower mirror 2 is mounted on the upper portion of the dashboard 3. The upper mirror 4 is shown mounted on a suitable housing 5 positioned on the roof 6 of the automobile. The rays from the upper mirror to the lower pass through the windshield.

Some of the important dimensions in this preferred embodiment rear-view system for use in an average size modern automobile are approximately as set forth below:

*Mounting—lower mirror mounted on dashboard*

Distance of driver's eye to lower mirror—700 millimeters.
Separation, lower mirror to mirror on cartop—700 millimeters.
Focal distance at angle of incidence of horizontal section through upper mirror—1400 millimeters (convex).
Focal distance at angle of incidence of horizontal section of lower mirror—1400 millimeters (concave).
Focal distance at angle of incidence of vertical section of upper mirror—350 millimeters (concave).
Focal distance at angle of incidence of vertical section of lower mirror—350 millimeters (concave).

EXAMPLE 2

Figure 3:
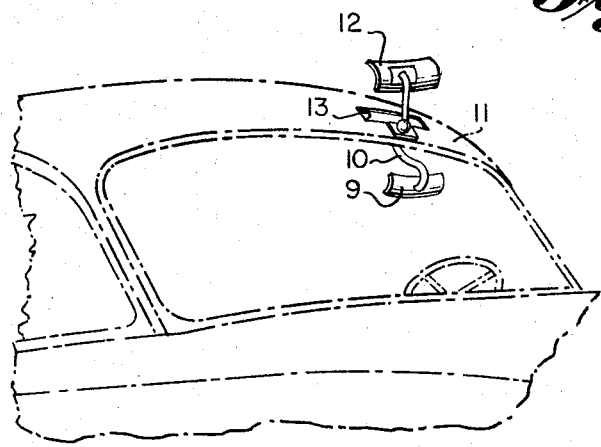
FIG. 3 is a perspective view similar to FIG. 1, showing the lower mirror mounted on a support extending down from the car roof and the upper mirror mounted on a support extending upward from the car roof above an opening therethrough.

Another embodiment, as shown in FIG. 3, is also a rear-view system for use on a modern automobile. In this embodiment the lower mirror 9 is mounted on a stem 10 which is fixed in and extends down from the automobile roof 11. The upper mirror 12 is mounted on a stem which is fixed in and extends upward from the roof 11. An opening 13 in the roof permits light to be reflected from the upper mirror 12 onto the lower mirror 9.

Approximate dimensions in this embodiment are as follows:

*Mounting—lower mirror mounted just back of and below top of windshield*

Distance from operator's eye to lower mirror—500 millimeters.
Distance from lower mirror to upper mirror—350 millimeters.
Focal distance at angle of incidence of upper mirror in horizontal section—1050 millimeters (convex).
Focal distance at angle of incidence of lower mirror in horizontal section—1050 millimeters (concave).
Focal distance at angle of incidence of upper mirror in vertical section—175 millimeters (concave).
Focal distance at angle of incidence of lower mirror in vertical section—175 millimeters (concave).

In both examples the mirrors may be selected of such length and width as to provide an adequate field of view but without undue size.

FIGS. 4–8 are diagrams of light rays and reflecting surfaces. They illustrate the problem faced by the prior art and the principle upon which this invention is based. Further, they illustrate for one building a rear-view mirror system using this invention, which and to what degree measurements are critical.

FIG. 4 shows both the problem which rear-view periscopes present and the solution of the mentioned prior art. Parallel rays 40 and 41 strike a flat diagonal mirror 43 which directs the rays downwardly while still parallel. The dotted line mirror 44 shows the problem with a rear-view periscope, using conventional plane mirrors, namely the image 45 is inverted as shown by the dotted arrow or by tracing the rays. The improvement of Ruberg was to use a concave cylindrical mirror 46 below instead of a second plane mirror, thereby producing a correctly erected image.

The bottom mirror 46 then converges the incoming parallel rays to the focal point at which point they diverge re-erected. From the diagram it is seen that if one views the image from a point between the mirror and the focal point, the image will be inverted. If viewed from beyond the focal point, the image will be correctly orientated but will be seriously astigmatic.

The amount of astigmatism when this system is in a car will usually be 2 diopters or more $$\left(\text{diopter} = \frac{1}{\text{focal length in meters}}\right)$$

The human eye cannot readily interpret an image with this amount of astigmatism. In driving, the eye must be focused to receive parallel rays (0 diopters) from distant objects to the front of the vehicle. The ordinary single plane rear-view mirror reflects incoming parallel rays backward still in parallel alignment and therefore may be glanced at while driving without time or strain spent in attempting to determine the information content of an astimgatic image. While the eye cannot accept large amounts of astigmatism, smaller amounts (0.30 diopters or so) are readily tolerated without resulting eye strain, see the aforementioned patent to Hyde, Col. 8, line 72.

FIG. 5 illustrates the essence of the present invention which is a structure to correctly reinvert an image formed by entering parallel rays and have these rays emerge still substantially parallel. The rays may acceptably emerge with up to 0.3 diopters astigmatism which will allow for normal variations in manufacture and installation dimensions.

If the lower mirror (53) is exactly the sum of the focal distances of the two mirrors along the path of the rays from the top mirror (52) then the emerging rays (50, 51) will be parallel.

To calculate the position of the focal point for parallel rays hitting the mirror obliquely, the general formula is:

$$F = \tfrac{1}{2} R \cos I$$

Where F is the distance of the focal point from the mirror, R is the radius of curvature and I is the angle of incidence.

FIG. 6 illustrates that for the above phenomenon to occur the focal distances of the two mirrors in the vertical section need not be equal. The parallel rays 60, 61 strike the larger radius upper mirror 62 which reflects them through the common focal point to the smaller radius mirror 63 where they emerge parallel and reinverted. In this case, the size of the image in the vertical plane will be in ratio to the size of the object as the radius of the upper mirror is to that of the lower mirror.

If the lower mirror is at any other position than the sum of the focal distances from the upper mirror, i.e., 64, the emerging rays will not be parallel, but in all cases either converging or diverging.

FIGS. 7 and 8 show schematically the reducing effect of having the two mirrors curved in the horizontal section. The upper mirror 72 is curved convexly with its focal distance ($f_{72}$) being behind and above the surface of the mirror. The lower mirror 73 is curved concavely in the horizontal section and its focal distance ($f_{73}$) is in front of and above the mirror. Parallel rays 70 and 71 first strike the upper mirror and are reflected by it to the lower mirror and then emerge from the lower mirror with divergence or convergence determined by the mirror radii and separation. For parallel incoming rays to emerge perfectly parallel, the distance between the mirrors will have to be such that the focal distance of the lower mirror ($f_{73}$) will be equal to the focal distance of the upper mirror ($f_{72}$) plus the distance D between the two mirrors as is illustrated in FIG. 7.

The field magnification in the horizontal plane is necessarily reduced when using mirrors with the convex-concave horizontal sections just described. If desired to produce an absolutely distortion-free and astigmatism-free image, the magnification will have to be correspondingly reduced in the vertical plane by having the focal distance of the upper mirror less than that of the lower mirror.

Expressed differently, for a distortion-free and astigmatism-free image, the focal distance of the upper mirror in the vertical plane ($f_{uv}$) will have to be to the focal distance of the lower mirror in the vertical plane ($f_{lv}$) as the focal distance of the upper mirror in the horizontal plane ($f_{uh}$) is to the focal distance of the lower mirror in the horizontal plane ($f_{lh}$). Also ($f_{uh}$) will have to be equal to $f_{lh}-D$ (the distance between the two mirrors). Expressed mathematically this becomes:

$$\frac{f_{uv}}{f_{lv}} = \frac{f_{uh}}{f_{lh}} = \frac{f_{lh}-D}{f_{lh}}$$

A readily derived formula for calculating the astigmatism in a two toric mirror system such as here disclosed, where A is the astigmatism in diopters, E is the distance from the lower mirror to the observer's eye and the other factors are as above identified, all values expressed positively, is $$A = \frac{1000}{\frac{f_{lh} \cdot D + f_{lh} \cdot f_{uh}}{D + f_{uh} - f_{lh}} - E}$$

Thus in the mirrors of Example 1, the aberration will be found to be about 0.29 diopters and that in Example 2 will be about 0.27 diopters. In Example 1, the upper mirror need be only ¾ as long for the specified angular field of view as when plano-cylinders are used. For Example 2, the upper mirror need be only ⅘ as long. Furthermore the distortion or aspect ratio is kept within acceptable bounds.

It is to be understood that the spacings of the mirrors and the proper radii of curvatures of the mirrors can be readily worked out to achieve the desired image size and an optimum value of each particular installation of the two mirror systems and that the dimensions set forth in the embodiments will not necessarily produce an optimum system for all automobiles. Moreover, the exact mechanical details and mountings are not essential to my invention and various hooded outside screened apertures can be used with the two mirror system as desired. We do not, therefore, intended to be limited by the details of the embodiments selected for illustrations but rather only the appended claims.

Having described our invention we claim:

1. The vehicular two toric rear-view mirror system comprising:
   (a) a first mirror mounted above the vehicle to receive rays from the rear and reflect them downwardly;
   (b) said first mirror having a reflecting surface convex in the horizontal meridian and concave in the vertical meridian;
   (c) a second mirror mounted below the first, positioned to receive the downwardly reflected rays from said first mirror and to direct said rays to the eye of a vehicle operator in normal operating position;
   (d) said second mirror having a reflecting surface concave in the horizontal and vertical meridians;
   (e) said mirrors being spaced apart a vertical distance approximately equal to the sum of the focal distances of the two mirrors in their respective vertical meridians; and
   (f) wherein the focal distances in the vertical section of the upper ($f_{uv}$) and lower ($f_{lv}$) mirrors, the focal distances in the horizontal section of the upper ($f_{uh}$) and lower ($f_{lh}$) mirrors, and the distance (D) separating the mirrors are related by:

$$\frac{f_{uv}}{f_{lv}} = \frac{f_{uh}}{f_{lh}} = \frac{f_{lh}-D}{f_{lh}}$$

2. A vehicular two toric rear-view mirror system comprising:
   (a) a first mirror mounted above the vehicle to receive rays from the rear and reflect them downwardly;
   (b) said first mirror having a reflecting surface convex in the horizontal meridian and concave in the vertical meridian;
   (c) a second mirror mounted below the first, positioned to receive the downwardly reflected rays from said first mirror and to direct said rays to the eye of a vehicle operator in normal operating position;
   (d) said second mirror having a reflecting surface concave in the horizontal and vertical meridians;
   (e) said mirrors being spaced apart a vertical distance approximately equal to the sum of the focal distances of the two mirrors in their respective vertical meridians; and
   (f) wherein the focal distances in the horizontal section of the upper ($f_{uh}$) and lower ($f_{lh}$) mirrors, the distance between the mirrors (D), and the distance from the lower mirror to the observer's eye (E) are related by:

$$A = \frac{1000}{\frac{f_{lh} \cdot D + f_{lh} \cdot f_{uh}}{D + F_{uh} - f_{lh}} - E}$$

Wherein A is between 0.0 and 0.3.

No references cited.

DAVID H. RUBIN, *Primary Examiner.*

RONALD J. STERN, *Assistant Examiner.*